United States Patent [19]

Yamamoto

[11] Patent Number: 4,770,443
[45] Date of Patent: Sep. 13, 1988

[54] INSERTED PART OF AN INDUSTRIAL ENDOSCOPE

[75] Inventor: Tsutomu Yamamoto, Hachioji, Japan

[73] Assignee: Olympus Optical Co., Ltd., Tokyo, Japan

[21] Appl. No.: 43,397

[22] Filed: Apr. 28, 1987

Related U.S. Application Data

[63] Continuation-in-part of Ser. No. 904,760, Sep. 5, 1986, abandoned, which is a continuation of Ser. No. 797,799, Nov. 15, 1985, abandoned, which is a continuation of Ser. No. 520,312, Aug. 4, 1983, abandoned.

[30] Foreign Application Priority Data

Aug. 4, 1982 [JP] Japan .................................. 57-136018
Aug. 4, 1982 [JP] Japan ............................ 57-118604[U]

[51] Int. Cl.⁴ .............................................. G02B 23/00
[52] U.S. Cl. ...................................... 285/39; 285/149; 285/321; 350/96.26
[58] Field of Search ................... 285/149, 321, 39, 317; 350/96.26

[56] References Cited

U.S. PATENT DOCUMENTS 2,479,483  8/1949  Ekleberry ...................... 285/149 X
3,081,767  3/1963  Hett ............................. 350/96.26 X
3,768,842  10/1973 Ahlstone ......................... 285/321 X
3,941,410  3/1976  Miyaoka .............................. 285/321
4,341,205  7/1982  Hosono et al. ............. 350/96.26 X

FOREIGN PATENT DOCUMENTS 1227327  8/1960  France .................................. 285/149
 784740  10/1957 United Kingdom ................ 285/149

Primary Examiner—Thomas F. Callaghan
Attorney, Agent, or Firm—Armstrong, Nikaido, Marmelstein & Kubovcik

[57] ABSTRACT

An insertable part of an industrial endoscope having an insertable curvable portion and a proximal flexible portions, the portions being interconnected and joined in axial alignment by a connecting means. A protective cover covering the insertable portion and a protective cover covering the proximal portion, the covers being interconnected and joined axially to each other and to the connecting means by interengaging concavoconvex parts having radially aligned grooves with a plurality of plate springs in one of such grooves projecting into the other of such grooves and being compressible through holes in one of the grooves into the other of the grooves to release the abutting ends of the protective covers.

6 Claims, 5 Drawing Sheets

FIG. 2
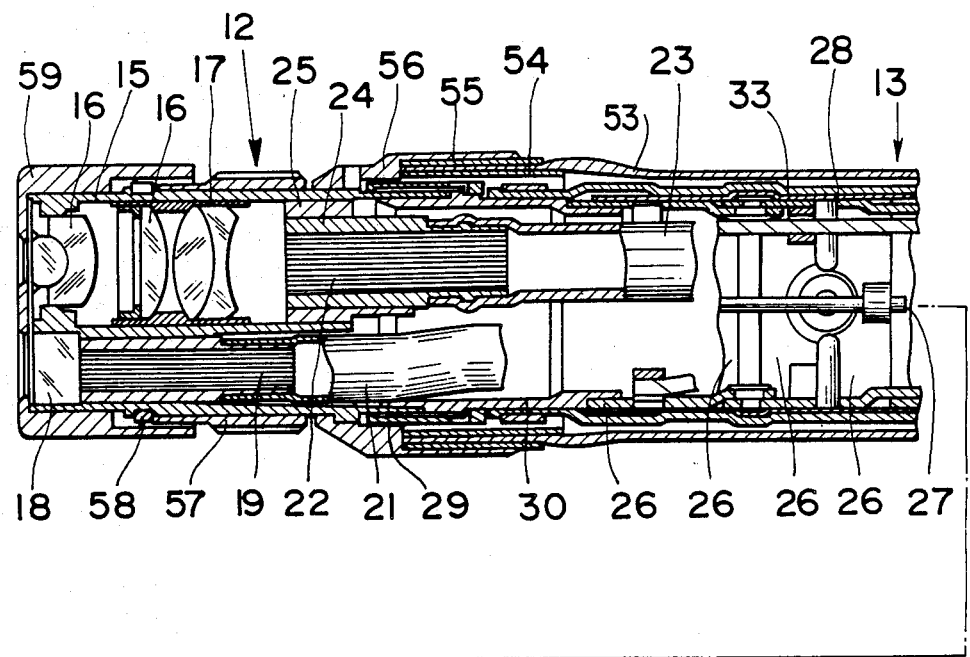
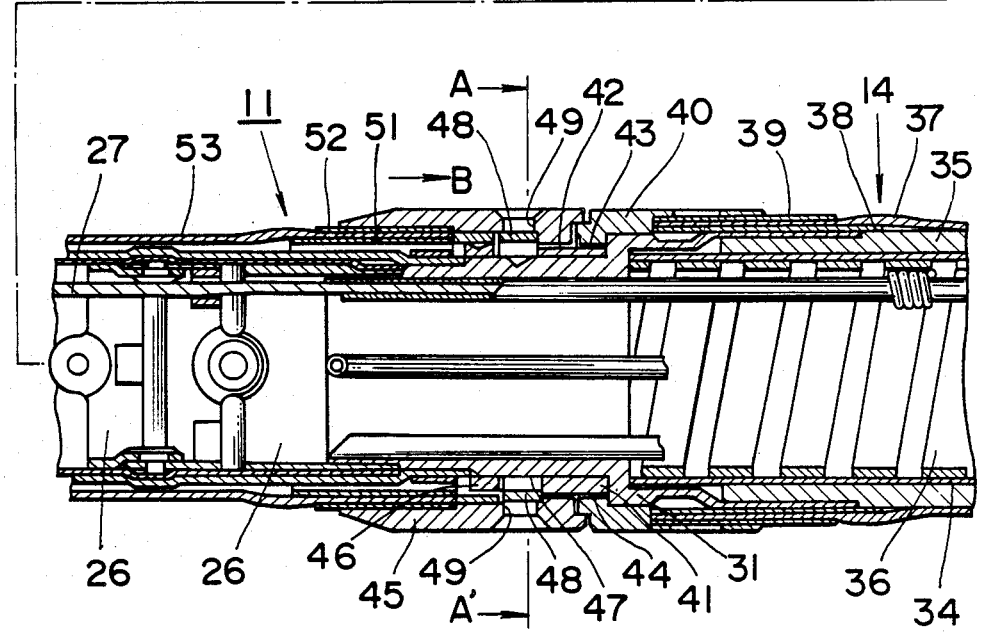

INSERTED PART OF AN INDUSTRIAL ENDOSCOPE

This application is a continuation-in-part of application Ser. No. 904,760, filed Sept. 5, 1986, now abandoned, in turn a continuation of Ser. No. 797,799, filed Nov. 15, 1985, now abandoned, which is a continuation of Ser. No. 520,312, filed Aug. 4, 1983, now abandoned, and relates to industrial endoscopes or fiberscopes having an insertion tube with a curvable leading section and a following trailing section and, more particularly, to an outer replacable cover for such insertion tubes.

BACKGROUND OF THE INVENTION

Medical endoscopes having an elongated insertion tube for insertion into a body cavity for observing, treating and for performing medical procedures on organs, such as, bladders, kidneys, intestines, and the like, of the human body are extensively used in the medical field. Such medical endoscopes usually include an illumination source at or near the tip or leading end of the insertion tube, optical means for view in the illuminated area the organ and means for insertion through the tube and into the body cavity of a medical instrument for carrying out the intended medical procedure. Illumination is most often provided to the illumination source at the tip end of the tube through an optical fiber bundle passing through the tube from the illuminating source at the leading end of the tube to the opposite tube end outside of the body cavity and a light source at the end of the optical fiber bundle outside of the body. Similarly, the optical viewing means at the tip end of the insertion tube which, most commonly, is a lens, is connected by an optical fiber bundle to a viewing means, which may be an eye-piece, a camera, a television receiver, or similar instrument connected to the opposite end of the insertion tube outside the body upon which the endoscope is used.

To facilitate insertion of the endoscope tube and the direction of the tube tip to the internal area or areas to be illuminated and observed and, where desired, medical procedures are to be performed, medical endoscopes are commonly provided at or immediately behind the leading end of the insertable tube with a tube section which can be curved or deflected by manipulation from the opposite end of the endoscope tube which remains outside of the body. Thus, for example, by turning a knob, crank or handle, at the opposite end of the insertion tube, the leading end portion of the tube can be curved or deflected. The following or remaining portion of the tube is flexible. While not being manipulated with a knob, crank, handle or other means outside the opposite tube end, as is possible with the leading end, nevertheless, the following or remaining tube portion can curve or deflect as conditions require. As the leading end is curved or deflected by manipulation of the knob, crank, handle or other means as the tube is being inserted, the flexible following tube portion follows the path set by the curved or deflected lead portion. The leading and following sections of the insertion tube are constructed to allow curving and deflecting without, of course, damage or impairment to the enclosed fiber optics and other units.

In addition to medical uses, endoscopes or fiberscopes have found uses for industrial purposes, such as the inspection of parts and surfaces in areas where viewing and inspection is otherwise restricted. Thus, industrial fiberscopes are used for the inspection of internal parts or cavities of turbines, engines, motors, boilers, pipe lines and a wide variety of other units where access can be obtained for the tip end of the tube and the tip end can be controlled or manipulated, such as by a knob, crank, handle, etc., from the opposite tube end to guide or lead the tip end through the access opening and passage to the area to be observed. In an industrial environment, such as a turbine, engine, motor boiler, etc., surfaces which may be encountered by the outer walls of the insertion tube, as the tube is being inserted into or withdrawn from the cavity and opening or, in use, may be and usually are rough, sharp and abrasive. This leads to wear and damage to the surface or outer walls of the insertion tube. To protect the outer wall of industrial endoscopes it is usual practice to cover the peripheral surface with a protective cover of knitted or woven fine metal wire. The protective cover is applied so as to be replacable. However, such prior covers have been continuous, that is formed of a single unit extending from the leading or tip end of the tube to the opposite end. Thus, if damage to the cover occurs at the curvable leading section, the entire length of the cover must be replaced, even though, in the following section, the cover is undamaged. This, of course, increases labor and costs.

SUMMARY OF THE INVENTION

In this invention, the protective cover for the endoscope or fiberscope for industrial uses is provided in a plurality of sections. One protective cover section extends from the metal housing of the optical adapter at the front, forward or distal end of the insertion tube along the length of the curvable leading tube section to the metal housing joining the curvable leading section to the following flexible tube section. The second protective cover section extends from the joining metal housing to the proximal end of the fiberscope tube at the tube end opposite the optical insertion end.

The protective cover sections of this invention are fixed to the tube in such manner that the cover will not rotate relative to the tube. Thus, the tube is not damaged by the cover.

The cover is easy to install, remove and replace and is connected to the tube in such manner that there are no parts to come lose and to drop off into the cavity being inspected. The protective cover does not interfere with the insertion and removal of the fiberscope nor in the flexibility and use thereof.

BRIEF DESCRIPTION OF THE DRAWINGS

The invention will be move fully described and will be better understood from the following description taken with the appended drawings of a preferred embodiment of the invention in which:

FIG. 2 is a view in section and partially broken away of the tip end and the tube coupling between the forward curvable section and the following flexible section of an endoscope or fiberscope embodying the invention;

DESCRIPTION OF THE PREFERRED EMBODIMENT

Figure 1:
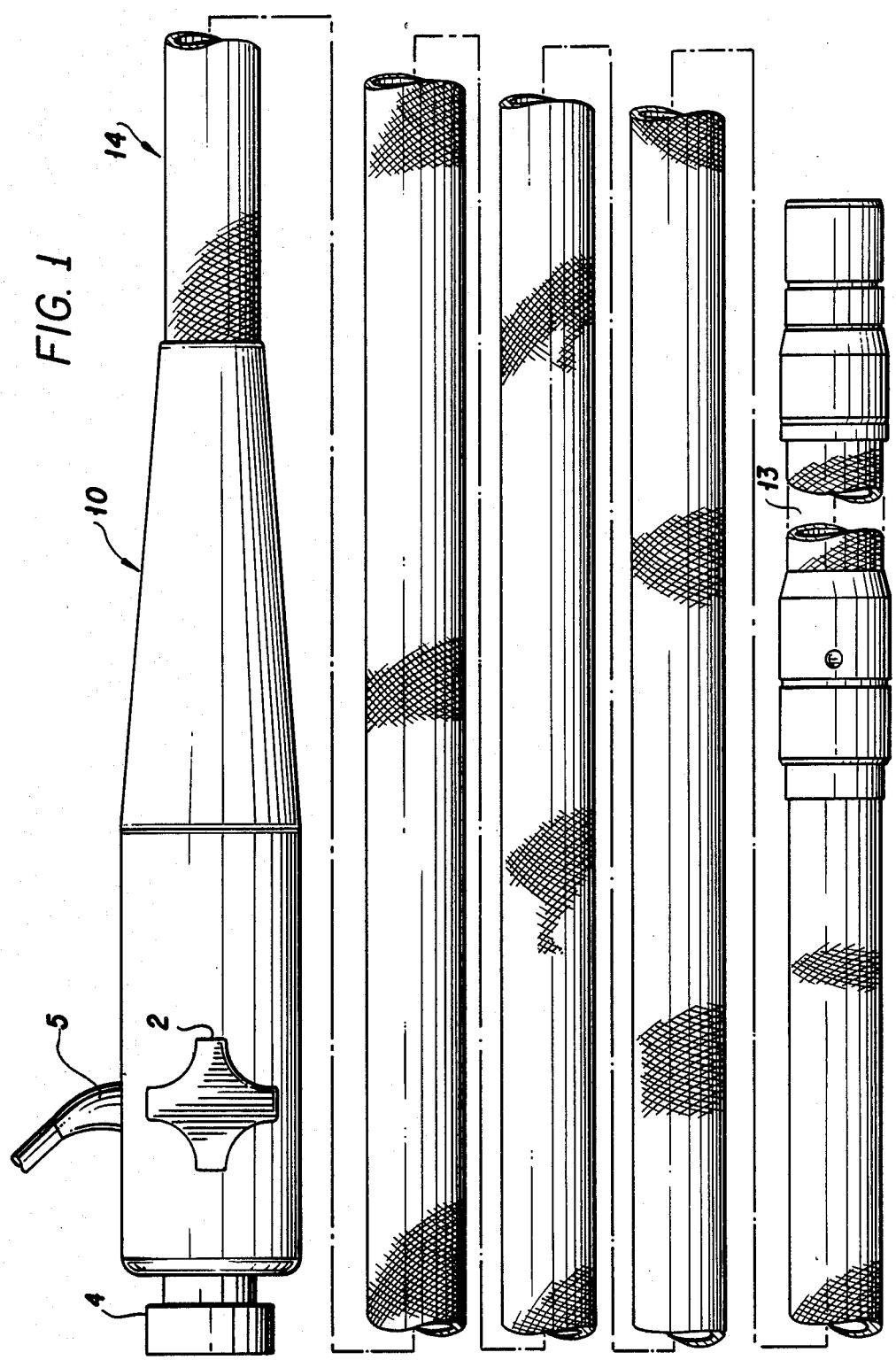
FIG. 1 is a view in broken away sections showing the tip end, forward curvable section, coupling, following flexible section and control end of an endoscope embodying the invention.

Referring to the drawings, the industrial endoscope or fiberscope, FIG. 1, includes a handle or operational part 10, a control knob 2 for curving the top end of the endoscope, an eyepiece 4 at the rear end of part 10 and a light guide cable 5 for connection to a light source, not shown, in conventional manner. At its forward end, handle or operational part 10 is connected to one end of flexible section 14 connected, at is opposite end, to one end of curvable portion 13 which in turn, is connected, at its opposite end, to tip part 12.

Tip part 12, FIG. 2, includes a tip member of metal, or the like, having a lens 16 and lens frame 17 connected to a flexible image guide fiber bundle 22 and optical tube 23 and a light guide fiber bundle 19 connected to light source tube 21 for projecting an illuminating light forward through a cover glass 18 in tip 12. Tip member 15, at the distal end of the endoscope, may also include a passage or channel connected to a tube, not shown, for the insertion of a tool from the proximal end, or operational part 10, of the endoscope for manipulating or working on an object at the distal end illuminated and observed through the endoscope from eyepiece 4 at its proximal end through curvable section 11 and flexible section 14.

Flexible image guide fiber bundle 22 is arranged as a transmitting means for images of objects positioned in front of the endoscope and to be observed or photographed from the proximal end of the endoscope through eyepiece 4. The image guide fiber bundle 22 is contained in optical tube member 23 of soft material making it possible to bend and curve the endoscope and observe the optical image formed by the lens frame 16, 17 at the rear or proximal end of the endoscope through eyepiece 4. Image guide fiber bundle 22 is fitted and contained in tubular member 24 and is fixed to the inside wall of the tip member 15 with an interposed member 25.

Figure 3:
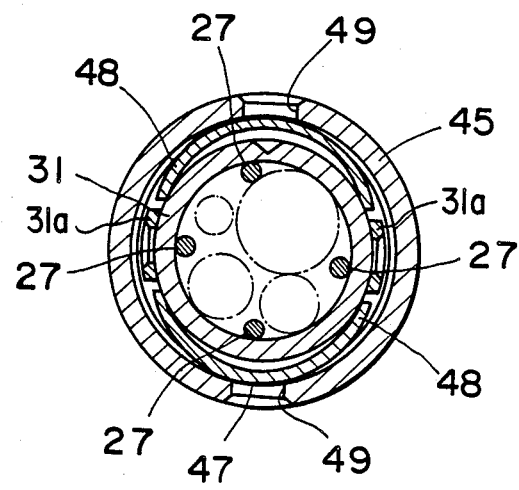
FIG. 3 is a sectional view taken at A—A FIG. 2.

A plurality of substantially annular articulated frames 26, FIG. 2, are rotatably arranged in the longitudinally direction of curvably tube 11 and are arranged to be manipulated by control knob 2 from the rear or handle end 10 of the endoscope to bend or curve the curvable end upward, downward, rightward or leftward by pulling and relaxing operating wires 27, FIGS. 2 and 3, extending into curvable portion 11 and operated from control knob 2 at the handle or proximal end 10 of the endoscope.

Articulated frames 26 are contained within a tube 28, FIG. 2, made by knitting fine wire of metal, or the like, coated or filled with a pliable plastic in the form of a net. The articulated frame 26 at the forward end, adjacent tip part 12, is fixed to the rear end of a tube body 30 fixed at its front end to tip member 15 with a substantially ring-shaped locking piece 29. At its opposite end, articulated frame 26 is fixed to the front end of a substantially tubular body part 31 formed as a step on the boundary of the curvable part 13 and flexible part 14 along with the rear end of the flexible tube 28. Flexible tube 28 covering articulated frames 26 is further covered on the outer periphery with a flexible tube member 33 of rubber, pliable plastic or other pliable material so as to be easy to curve. Tube member 33 is pressed and fixed at its opposite ends with ring-shaped members so as to be liquid-tight.

Net tube 34 and flexible tube 35 fitting and containing the net tube 34 on flexible section 14 are formed of a resin or the like and are fixed, respectively, at their front ends to the inner periphery of the rear end of body part 31 with a bonding agent, or the like. A flexible spiral tube 36, formed by spirally winding a long thin plate-shaped member, is inserted through the inner periphery of the net tube 34. The image transmitting image guide fiber 22 and illuminating light transmitting light guide fiber 19 and pass longitudinally through the inside of spiral tube 36.

Figure 4:
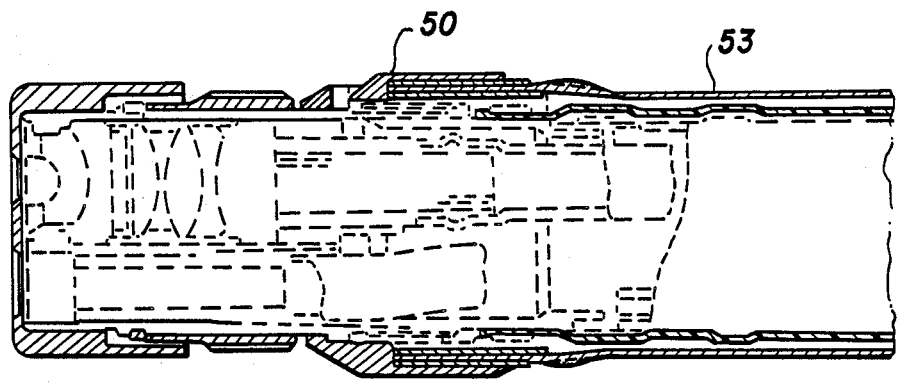
FIG. 4 is a sectional view of the tip end of the endoscope of FIG. 2 showing the outer housing and protective cover with the inner parts in phanthom.
Figure 5:
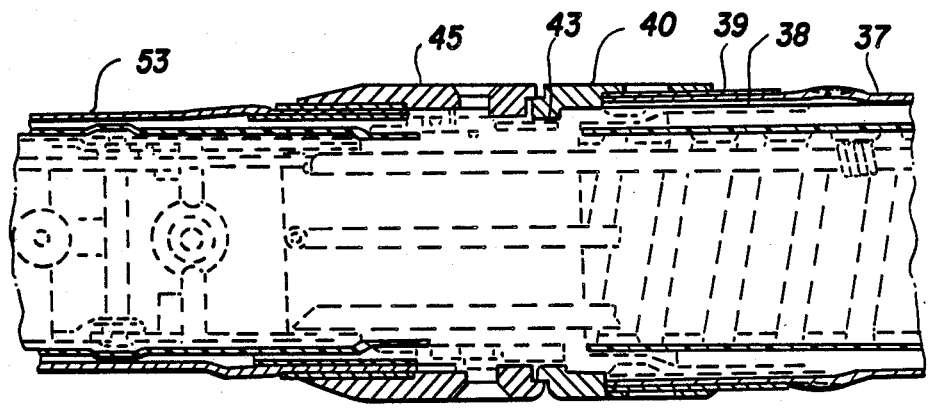
FIG. 5 is a sectional view of the outer tube, coupling between the forward curvable section and the following flexible section of an endoscope or fiberscope embodying the invention, and, FIG. 6 is a view, partly in section and partly broken away, of the control end of an endoscope or fiberscope embodying the invention.

The flexible tube 35 of the flexible section 14 and the flexible tube member 33 of the curvable part or section 13 of the industrial endoscope or fiberscope of the instant invention are covered or protected by a protective cover 37, 53 of knitted or woven metal wire, knitted and woven into a tube and extending from the handle or proximal end 10 along flexible section 14 to a metal tubular connector member 40, FIGS. 2 and 5, at the junction between flexible section 14 and curvable section 13 and from a second metal tubular connector member 45 interconnected at such junction to the first tubular connector member 40 and along curvable section 13 to metal tubular members 56, FIGS. 2 and 4 adjacent tip 12.

Figure 6:
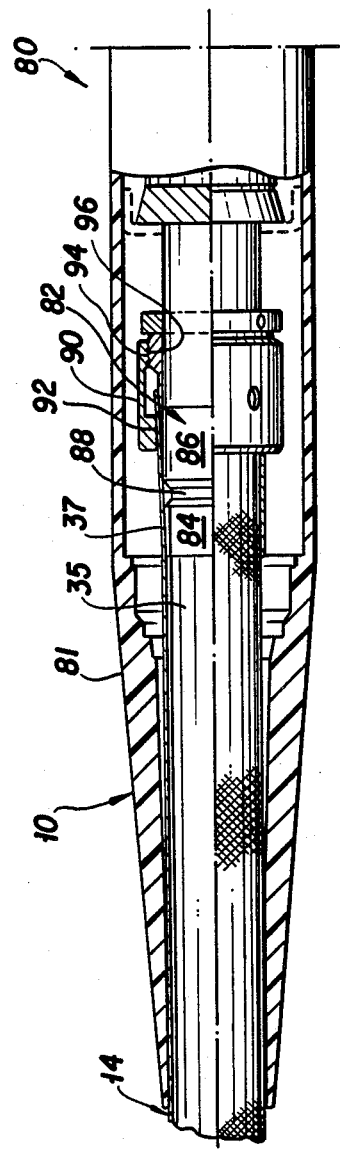

Starting at the handle end 80 covered by a tubular cover 81 of rubber, plastic or similar material, FIG. 6, from which end the protective cover 37 fitted and attached to the industrial endoscope or fiberscope, net tube 34, flexible tube 35 and spiral tube 36, FIGS. 2 and 6, terminate at the handle end 10 in a cylindrical housing 82, having a first cylindrical outer surface 84 with an outer diameter substantially the same as the outer diameter of flexible tube 35, a second cylindrical outer surface 86 of slightly larger diameter, a groove 88 therebetween and a cap 90 tapered at 92 so as to wedge protective cover 37 between taper 92 and larger diameter outer surface 86 as cap 90 is tightened thereon on threads 94 on the flange of cap 90 and threads 96 on housing 82. Because protective cover 37 is of knitted or woven metal wire, the end of cover 37 can be expanded sufficiently to slip over larger diameter outer surface 86 by compressing the end of cover 37 longitudinally. With the end longitudinally compressed, the slightly enlarged end of cover 37, with cover 37 extending along the outer surface of flexible tube 35 is slipped over the smaller surface 84 and larger surface 86 of cylindrical housing 82 and is gripped and held thereon by tightening cap 90 on threads 96 of housing 82. From housing 82, tubular protective shield 37 extends along flexible tube 35 of flexible section 14 to connector member 40, FIGS. 2 and 5, above tubular body part 31 at the boundary between flexible section 14 and curvable section 13.

At the boundary between sections 14, 13, FIGS. 2 and 5, protective cover 37 is pressed and held at the front end with both tubular members of an inner tube 38 and outer tube 39 and is fixed to tubes 38, 39, FIGS. 2 and 5 by calking, soldering, (silver) brazing or spot-welding or with a bonding agent or the like. Protective cover 37 is then cut so as not to peel at the end, is fitted in the mouthpiece part of annular or tubular member 40, tapered at the end receiving tubes 38,39 and cover 37, and is secured to member 40 by soldering or brazing or with a bonding agent or the like. The inner tube 38 extends rearward and is longer than the outer tube 39. Protective cover 37 will expand in the radial direction in the part adjacent to and held by outer tube 39 so that the outside diameter of cover 37 will be substantially the same as the outside diameter of the thin-walled outer tube 39 or the area of protective cover 37 adjacent outer tube 39 may be filled with solder or a plastic to provide a smooth surface or joint between cover 37 and the end of outer tube 39. The mouthpiece end of member 40 is tapered and is shorter than outer tube 39 so as to form a relatively smooth joint between the outer walls of member 40 and outer tube 39. Thus, no catching step is formed between the outer walls of member 40 and tube 39.

The front, inner end of member 40, FIGS. 2 and 5, is provided with an inwardly extending engaging part 43 for engagement with an abutment on body part 31. Engaging part 43 is provided with internal teeth engaging with a plurality of engaging concavoconvex parts 41, 42 having external teeth and made integral with the body part 31 by bonding or the like. A substantially annular connecting member 45 having an engaging part 44 with internal teeth for engagement with the above mentioned concavoconvex parts 41,42 engages member 40 when connecting member 45 is moved from right to left, FIG. 2, as indicated by the arrow B. The concavoconvex parts 41,42 and the concavoconvexes of the engaging parts 43,44 and the teeth thereon are fitted and locked with each other so that the connecting members 40,45 may not rotate in the peripheral direction. In the above mentioned engagement by the concavoconvexes, tooth parts 41,42, and 43, 44, it is not necessary to rotate screws, or the like, for positioning and locking connecting members 40,45 in the peripheral direction.

An annular member 46, FIG. 2, is fixed to the outer periphery of body part 31 forming a groove 47 or recess in the peripheral direction on the outer periphery of the intermediate body part 31 between annular members 41, 42 and 46. As shown in FIG. 3 accurate plate springs 48 are contained in the groove 47. These plate springs 48 are regulated in the movement in the peripheral direction by projecting pieces 31a, 31a, in the groove 47.

Springs 48 are biased to a radius of curvature smaller than the radius of the outer periphery of groove 47 in body part 31. Springs 48 in the groove 47 project outward in the radial direction into the recess in the inner periphery of the connecting member 45 and are fixed at their ends to the annular member 41 so that the connecting member 45 can not move in the axial direction of body part 31. On the other hand, holes 49, 49 are formed on the outer periphery of connecting member 45 above groove 47 in which plate springs 48 project. When plate springs 48 are pressed inward with pins, or the like, from outside through holes 49 and the connecting member 45 is moved in the direction reverse to the arrow B, the concavoconvexes are released and the connecting member 45 can be disengaged from connecting member 41.

In such engaging means by a plurality (preferably more) of concavoconvexes, for example, even if there is a deviation (in the peripheral direction) between the concavoconvex parts 41, 42 and engaging parts 44, such positioning in the peripheral direction, as by twisting, will not be substantially required and a removable engagement will be able to be made. Therefore, there are advantages that the maintenance and repair can be made easily and there is no danger of dropping as in the case where connecting screws are used.

The above mentioned connecting member 45 is incised on the front inner periphery end to form a thin-walled mouthpiece part. As on the rear end side of the above mentioned fixing member 40, a protective cover 53, FIGS. 2, 4 and 5, further covering the tube member 33, formed of knitted or woven metal wire, rubber, or the like, covering the curved part 13 on the outer periphery is pressed and held at the rear end by an inner tube 51 and outer tube 52, is fitted and contained in the thin-walled mouthpiece part of connecting member 45, FIGS. 2 and 5 and fixed thereto by soldering or silver brazing. Inner tube 51 projects forward and is longer than outer tube 52. Outer tube 52 projects forward of the thin-walled mouthpiece part of the connecting member 45 on its outer periphery.

The inside diameter of inner tube 51 is slightly larger than the outside diameter of the rear end part of the net tube 28 fixed on its inside to provide a clearance so that plate springs 48 may be pressed inward, the connecting member 45 may be moved forward and to the left in FIG. 2, reversely to the indication of the arrow B, and the splines or the like may be disengaged. Thus, connecting members 40,45 can be disconnected and protective cover 53 can be removed and replaced.

At its opposite end, FIGS. 2 and 4, protective cover 53 is pressed and held at it front end by an inner tube 54 and outer tube 55 fixed to connecting member 56. Protective cover 53 is cut at its front or forward end in the appropriate length and outer tube 55 is fitted on the outer periphery of cover 53 and into the thin-walled mouthpiece, part at the rear end of an annular or tubular connecting member 56 and is secured by soldering or silver brazing to connecting member 56. Connecting member 56 has a radially inward projecting projection formed at its front end for contact with a projection formed on the outer periphery of the tip member 15. Inner tube 54 projects rearward of the outer tube 55 and the outer tube 55 projects rearward of the thin-walled mouthpiece part of the fixing member 56 so that the inserted part 11 of the endoscope or fiberscope, with protective cover 53 in place, may be smoothly inserted and removed.

A fixing ring 57, FIG. 2, having male threads on the outer periphery adjacent the front end and a knurling on the outer periphery adjacent the rear end is externally fitted on the outer periphery of tip member 15 adjacent to connecting member 56 and is provided at its front end surface with a snap ring 58 removably fitted in a recess formed on the outer periphery of the tip member 15 to prevent ring 57 from being removed when snap ring 58 is in place. Fixing ring 57 is fitted to tubular cover member 59 by screwing female threads formed on the rear end inner periphery of tubular cover member 59 onto male threads formed on tip part 12 and can be removed by unscrewing the threads.

When the tubular cover member 59 and ring 58 are removed, as described above, fixing ring 57 can be removed. With fixing-ring 57 removed and plate springs 48 depressed through holes 49, connecting members 56, 45, with protective cover 53 fixed thereto and therebetween, can be slipped, axially from the distal end of the endoscope or fiberscope and the protective cover from the curved part 13 is removed. Protective cover 53 fitted with connecting member 56 at the front end and with connecting member 45 at the rear end, can thus be removed by being moved in the direction reverse to the indication of the arrow B, FIG. 2 and the protective cover 53 can be replaced.

With protective cover 53 removed, protective cover 37, on flexible section 14 can be removed by first sliding cover 81 to the left, FIG. 6, along flexible tube 35 and cover 37 to expose cap 90. Cap 90 is turned and threaded off of threads 96 on housing 82 and removed from housing 82 by sliding cap 90 to the left, FIG. 6, over protective cover 37, releasing the end of protective cover 37 from between cap 90 and taper 92. With protective cover 53, and member 45 attached thereto, removed from curved part 13 and plate springs 48 depressed so as to clear the I.D. of engaging part 43 of member 40, member 40, with protective cover 37 attached thereto, can slide over curved part 13 and be removed from the endoscope or fiberscope and, if broken or damaged, can be replaced.

It is, of course, not necessary for the removal and replacement of protective cover 53, when cover 53 is broken or damaged and is to be replaced, to remove protective cover 37. Therefore, if protective cover 53 on curvable portion 13 or protective cover 37 on flexible portion 14 is damaged or broken, without the other protective cover being damaged or broken, only the damaged or broken protective cover will require replacement.

Further, the protective cover 53 covering the curvable portion 13 and the protective cover 37 covering the flexible portion 14 can be formed of materials different in characteristics and more suited to the characteristics of the portion covered.

For example, when the diameter of the wire of the net tube making up the protective cover 53 covering the curvable portion 13 is made smaller, that is, the wire is made thinner, protective cover 53 will be more flexible and easier to curve. On the other hand, when making up protective cover 37 for flexible portion 14 the wire is made larger in diameter or thicker and protective cover 37, in flexible portion 14, where flexibility can be limited, is more durable.

It is apparent that working modes different in a wide range can be formed without deviating from the spirit and scope of the present invention. Therefore, the present invention is not restricted by the specific working mode except being limited in the appended claims.

WHAT IS CLAIMED:

1. An insertable part of an industrial endoscope having a curvable portion formed near the top of the insertable portion, a flexible proximal portion and means interconnecting and joining said curvable insertable portion and said flexible proximal portion in axial alignment characterized in that a tubular protective cover is fitted to and extends axially along the outer periphery of said curvable insertable portion and that a tubular protective cover is fitted to and extends axially along the outer periphery of said flexible proximal portion, said insertable portion protective cover and said proximal portion protective cover abutting at one of their ends and being interconnected and joined at said abutting ends in axial alignment, one with the other, and joined to said means interconnecting and joining said insertable portion and said proximal portion by means at said abutting ends, said insertable portion protective cover being connected at its opposite end to the distal end of said curvable insertable portion and said flexible portion protective cover being connected at its opposite end to the proximal end of said flexible proximal portion.

2. An insertable part of an industrial endoscope according to claim 1, characterized in that said tubular protective cover on the outer periphery of said curvable insertable portion is more flexible than said tubular protective cover on the outer periphery of said flexible proximal portion.

3. An insertable part of an industrial endoscope according to claim 1, characterized in that said tubular protective covers are tubular members of knitted fine wires.

4. An insertable part of an industrial endoscope according to claim 3, characterized in that the diameter of said knitted fine wires in said tubular protective cover on the outer periphery of said insertable portion are smaller than said knitted fine wires in said tubular protective cover on the outer periphery of said proximal portion.

5. An insertable part of an industrial endoscope according to claim 1, characterized in that said means at said abutting ends of said protective covers includes a connecting means on the abutting end of each of said covers, said connecting means each including said plurality of concavoconvex parts on the connecting means of one of said abutting ends of one of said protective covers mating with and being axially movable with respect to said plurality of concavoconvex parts on the connecting means of the other of said abutting ends of said protective cover for connecting and disconnecting said abutting ends.

6. An insertable part of an industrial endoscope according to claim 5, characterized in that said concavoconvex parts on said connecting means include radially aligned grooves formed in said concavoconvex parts, the aligned groove in one of said connecting means having plate springs projecting into the aligned groove on the other of said connecting means and guide holes in one of said connecting means extending through said groove and forming an opening for pressing said plate springs radially inward for releasing said plate springs from one of said grooves and compressing said plate springs into the other of said grooves for separating the abutting ends of said protective covers.

* * * * *